US010826402B1

(12) United States Patent
Stuler et al.

(10) Patent No.: US 10,826,402 B1
(45) Date of Patent: Nov. 3, 2020

(54) METHODS AND SYSTEMS OF CONTROLLING SWITCHING FREQUENCY OF LLC RESONANT POWER CONVERTERS

(71) Applicant: SEMICONDUCTOR COMPONENTS INDUSTRIES, LLC, Phoenix, AZ (US)

(72) Inventors: Roman Stuler, Karolinka (CZ); Vaclav Drda, Valasska Bystrice (CZ); Roman Mazgut, Zilina (SK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/674,079

(22) Filed: Nov. 5, 2019

Related U.S. Application Data

(60) Provisional application No. 62/896,247, filed on Sep. 5, 2019.

(51) Int. Cl.
*H02M 3/335* (2006.01)

(52) U.S. Cl.
CPC ... *H02M 3/33523* (2013.01); *H02M 3/33546* (2013.01); *H02M 3/33576* (2013.01)

(58) Field of Classification Search
CPC ......... H02M 3/33523; H02M 3/33576; H02M 3/33546
See application file for complete search history.

(56) References Cited

U.S. PATENT DOCUMENTS

| 9,564,826 | B2 * | 2/2017 | Sugahara | H02M 1/4225 |
|---|---|---|---|---|
| 10,326,377 | B1 * | 6/2019 | Xiong | H05B 45/305 |
| 2013/0343096 | A1 * | 12/2013 | Stuler | H02M 1/32 363/21.02 |
| 2015/0194896 | A1 * | 7/2015 | Stuler | H02M 3/33569 363/21.02 |
| 2017/0346397 | A1 * | 11/2017 | Babazadeh | H02M 3/157 |
| 2017/0373604 | A1 * | 12/2017 | Chen | H02M 1/36 |
| 2018/0262116 | A1 | 9/2018 | Ouyang | |
| 2018/0309373 | A1 * | 10/2018 | Chang | H02M 3/33523 |
| 2018/0337608 | A1 * | 11/2018 | Hari | H02M 3/33507 |
| 2019/0386558 | A1 * | 12/2019 | Drda | H02M 3/33569 |

OTHER PUBLICATIONS

Feng, Weiyi, et al.; Pulsewidth Locked Loop (PWLL) for Automatic Resonant Frequency Tracking in LLC DC-DC Transformer (LLC-DCX); IEEE Transactions on Power Electronics, vol. 28, No. 4, Apr. 2013; pp. 1862-1869; Publication No. 0885-8993; Copyright 2012 IEEE.

* cited by examiner

*Primary Examiner* — Emily P Pham
(74) *Attorney, Agent, or Firm* — Dickinson Wright PLLC; Mark E. Scott (57) ABSTRACT

Controlling switching frequency of LLC resonant power converters. At least one example embodiment is a method of operating LLC converter, including: measuring values indicative of current through a primary winding of a transformer of an LLC converter, the measuring during a first on-time of a first switching period of an electrically controlled switch coupled to the primary winding, and the measuring creates a current waveform; calculating a slope of the current waveform; and controlling frequency of switching the electrically controlled switch based on the slope.

20 Claims, 8 Drawing Sheets

METHODS AND SYSTEMS OF CONTROLLING SWITCHING FREQUENCY OF LLC RESONANT POWER CONVERTERS

CROSS-REFERENCE TO RELATED APPLICATIONS

This application claims the benefit of U.S. Provisional Patent Application No. 62/896,247, filed on Sep. 5, 2019, the entire contents of which is incorporated herein by reference.

BACKGROUND

Resonant power converters utilize a resonant circuit on the primary side of the power converter to create an alternating current (AC) signal applied to a primary winding of a transformer. Electrically-controlled switches on the primary side of the resonant power converter are used to create the AC signal and are controlled by a primary-side controller. The AC signal applied to the primary winding is transferred across the transformer to create an AC signal on a secondary winding of the transformer. The AC signal on the secondary winding is then rectified to supply a direct current (DC) voltage to a load.

Resonant power converters have their best efficiency when operating at or near resonance. However, because of factors such as manufacturing tolerance of devices, age of device, and temperature of devices, the actual resonant frequency of resonant power converters may change over time.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Controller" shall mean, alone or in combination, individual circuit components, an application specific integrated circuit (ASIC), a microcontroller with controlling software, a digital signal processor (DSP), a processor with controlling software, or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Example embodiments are directed to controlling switching frequency of inductor-inductor-capacitor (LLC) resonant power converters. More particularly, example embodiments are directed to controlling frequency of switching of LLC resonant power converters based on the slope of a current waveform of a primary winding of a transformer. In some cases, the frequency control comprises setting an on-time or conduction time of a high-side electrically controlled switch in a subsequent switching period based on the slope calculations associated with a first on-time in a first switching period. For example, if the slope indicates that the frequency is below the resonant frequency, then the frequency is increased slightly for a subsequent switching period. And if the slope indicates that the frequency matches the resonant frequency, then to ensure the LLC resonant converter operates at or slightly below resonance, then the frequency is decreased slightly for a subsequent switching period. In these example embodiments, in steady-state operation the frequency of operation toggles back and forth between operating at resonance and operating slightly below resonance. In other cases, the on-time or conduction time of the high-side electrically controlled switch is ended in each on-time when the slope indicates the switching frequency is slightly below resonance. The specification now describes an example resonant power converter to orient the reader.

Figure 1:
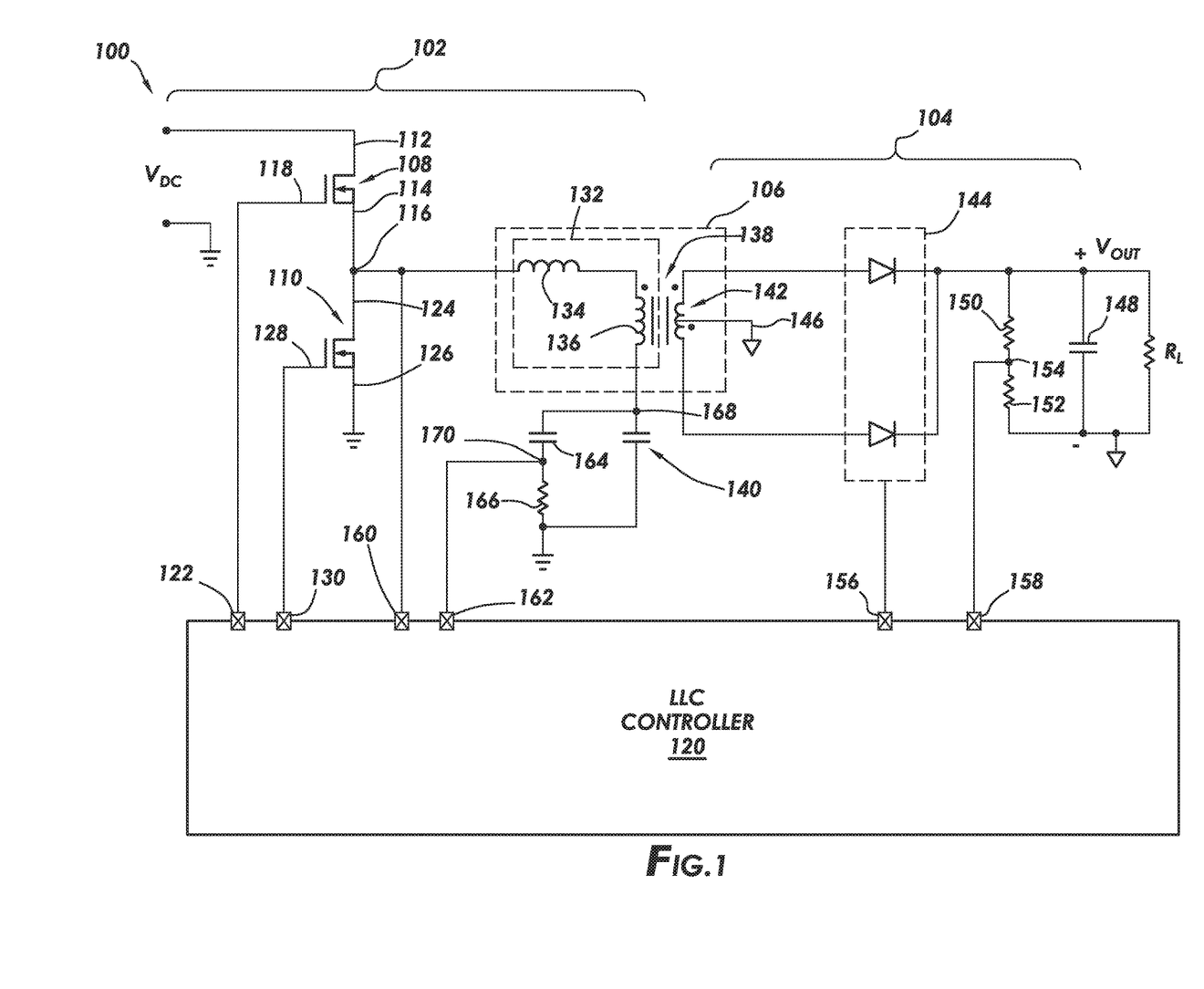
FIG. 1 shows an LLC converter in accordance with at least some embodiments.

FIG. 1 shows an LLC resonant power converter in accordance with at least some embodiments. In particular, the LLC resonant power converter 100 (hereafter "LLC converter 100") of FIG. 1 comprises a primary side 102 and a secondary side 104 coupled by a transformer 106. Working from left to right in FIG. 1, the LLC converter 100 comprises a high-side electrically-controlled switch in the example form of a high-side field effect transistor (FET) 108. The high-side FET 108 has a drain 112 coupled to the input direct current (DC) voltage (hereafter input voltage $V_{DC}$), and a source 114 coupled to a switch node 116. The gate 118 of the high-side FET 108 couples to an LLC controller 120 by way of a high-gate terminal 122. When commanded by the LLC controller 120 by assertion of the gate 118, the high-side FET 108 couples the switch node 116 (and thus transformer 106) to the input voltage $V_{DC}$. FIG. 1 further comprises a low-side electrically controlled switch in the example form of a low-side FET 110. The low-side FET 110 has a drain 124 coupled to the switch node 116, and a source 126 coupled to ground on the primary side 102. The gate 128 of the low-side FET 110 couples to the LLC controller 120 by way of a low-gate terminal 130. When commanded by the LLC controller 120 by assertion of the gate 128, the low-side FET 110 couples the switch node 116 to ground on the primary side. In operation, the LLC controller 120 alternately couples the switch node 116 to the input voltage $V_{DC}$ and then to ground by way of the high-side FET 108 and low-side FET 110, respectively, creating an alternating current (AC) signal at the switch node 116 (and thus applying the AC signal to the transformer 106). In order not to short the input voltage $V_{DC}$ to ground, the LLC controller 120 is designed and constructed such that the high-side FET 108 and low-side FET 110 are not simultaneously commanded to conduct (i.e., there is a dead zone or dead band of time between assertion of the respective gates).

The switch node 116 is coupled to the primary winding 132 of the transformer 106. The primary winding 132 in FIG. 1 is shown as separated inductances, with leakage inductance of the primary winding 132 represented by leakage inductance 134, and primary inductance of the primary winding 132 represented by primary inductance 136 (the primary inductance associated with the metallic core 138). In series with the primary winding 132 is capacitor 140. That is, capacitor 140 is coupled between a second terminal or connection of the primary winding 132 and ground on the primary side 102. The leakage inductance 134, primary inductance 136, and capacitor 140 thus create a tank circuit or LLC resonant circuit on the primary side 102. Depending on the specific design of the LLC converter 100, an additional inductor may be included in the circuit (e.g., between the switch node 116 and the leakage inductance 134). The AC signal driven to the switch node 116 has a frequency that may be at or near the resonant frequency of the tank circuit.

Still referring to FIG. 1, the transformer 106 further comprises a secondary winding 142 coupled to a full-wave rectifier 144. The example secondary side 104 shown in FIG. 1 has a center tap 146 coupled to common on the secondary side 104. The other terminals of the secondary winding 142 couple to the example full-wave rectifier 144 illustrative shown as two diodes. In other cases, the center tap 146 may be electrically floated, and the two remaining terminals coupled to another example bridge rectifier having four diodes. In yet still further cases, rectification on the secondary side may be by way electrically controlled switches (such as synchronous rectifier (SR) FETs), and in example cases the LLC controller 120 may control the SR FETs, such as by one or more rectifier terminals 156. The example full-wave rectifier 144 is coupled to a smoothing capacitor 148 which filters the rectified signal produced by the full-wave rectifier 144 to create the output voltage $V_{OUT}$. In the example system, a load is illustratively shown as a resistor $R_L$ (hereafter "load $R_L$") coupled across the output voltage $V_{OUT}$.

In the example system, the LLC controller 120 may sense output voltage $V_{OUT}$ as part of the overall control strategy. In particular, the example system has a voltage divider illustratively comprising resistor 150 and resistor 152 coupled in series. Resistor 150 is coupled to the output voltage $V_{OUT}$, and resistor 152 is coupled to ground or common on the secondary side 104. The resistors 150 and 152 define a sense node 154 between them, and the sense node 154 is coupled to a feedback terminal 158 of the LLC controller 120. Thus, the voltage divider creates a scaled representation of the output voltage $V_{OUT}$ provided to the feedback terminal 158.

In operation, the high-side FET 108 and low-side FET 110 alternately couple the switch node 116 to the input voltage $V_{DC}$ and ground, thus creating the AC signal applied to the primary winding 132. The AC signal applied to the primary winding 132 is transferred across the transformer 106 to create an AC signal on the secondary winding 142 (with the voltage relationship between the AC signal on the primary winding and the AC signal on the secondary winding based on the turns ratio of the transformer). The AC signal created on the secondary winding 142 is then rectified by the example bridge rectifier 144 and smoothed to create the output voltage $V_{OUT}$ applied to the load $R_L$.

The LLC controller 120 controls the frequency of the AC signal at switch node 116 (i.e., controls the frequency of the assertion of the gate signals to the high-side FET 108 and low-side FET 110). In accordance with example embodiments, the frequency of the gate signals applied to the high-side FET 108 and low-side FET 110, and thus the fundamental frequency of the AC signal at the switch node 116, is managed or controlled based on several signals. One example signal may be the signal representative of output voltage sensed at the feedback terminal 158. Another example signal used by the LLC controller 120 may be a signal representative of the AC signal at switch node 116 sensed at a switch-node terminal 160. Yet another example signal is a signal representative of current in the primary winding 132 sensed at current-sense terminal 162.

In particular, the current-sense terminal 162 in the example system couples to primary current sensing circuit illustratively shown as capacitor 164 and resistor 166. The capacitor 164 and resistor 166 are coupled in series, and in the example system the capacitor 164 and resistor 166 are coupled in parallel to capacitor 140. In the example system the current-sense terminal 162 is coupled at the node 170 defined between the capacitor 164 and the resistor 166. Thus, by way of current-sense terminal 162, the example LLC controller 120 can measure values indicative of current through the primary winding 132 of the transformer 106. The specification now turns to a set of example waveforms to explain operation of the system.

Figure 2:
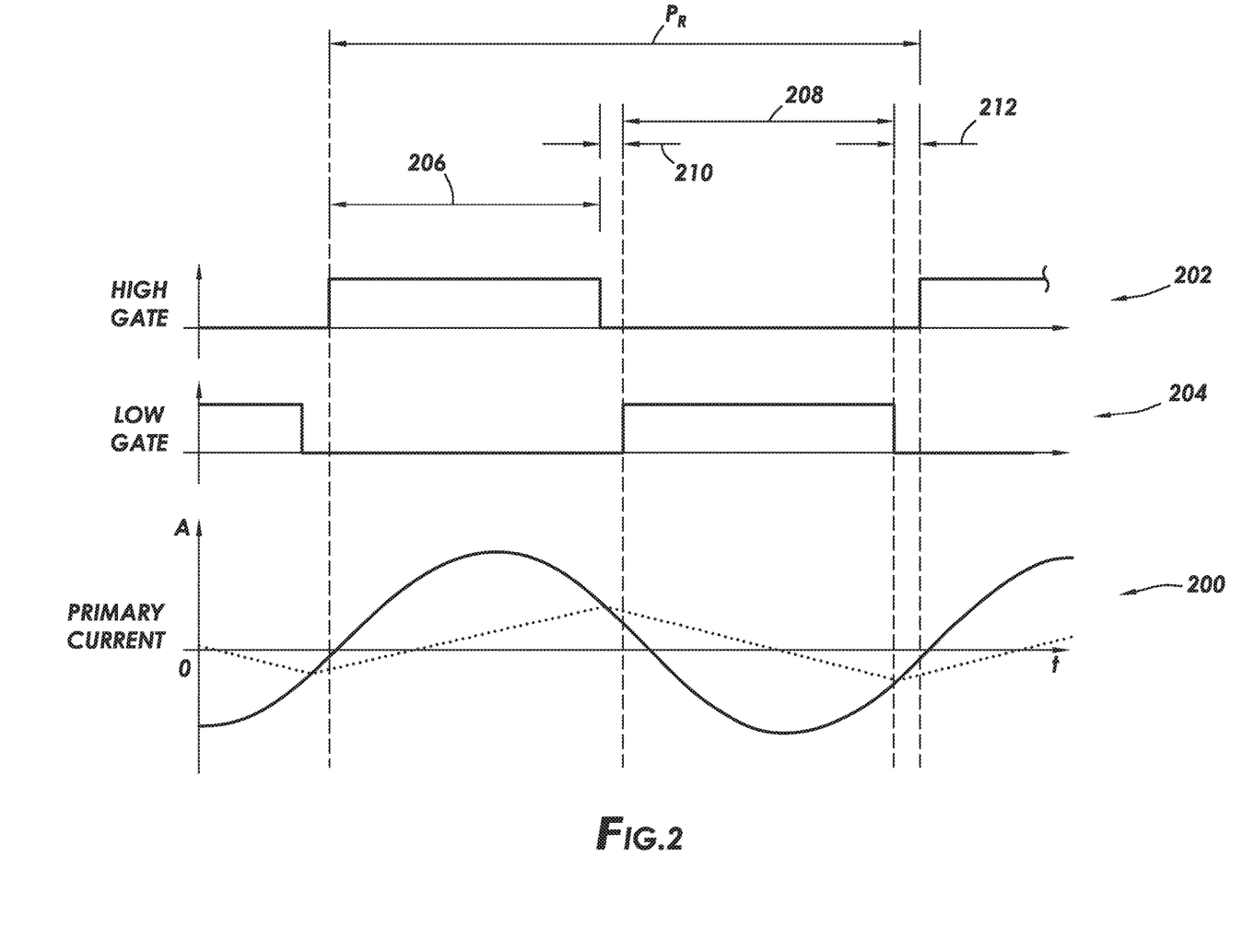
FIG. 2 shows an example set of waveforms of an LLC converter operating at resonance in accordance with at least some embodiments.

FIG. 2 shows an example set of waveforms of an LLC converter operating at resonance, in accordance with at least some embodiments. In particular, FIG. 2 includes plot 200 that shows primary current (solid line) as well as magnetizing current (dashed line) as a function of time. FIG. 2 also includes plot 202 that shows a high-gate signal driven to the high-gate terminal 122 (FIG. 1), and plot 204 that shows a low-gate signal driven to the low-gate terminal 130 (FIG. 1). The signals for the gate terminals are plotted on corresponding time with the primary current. Moreover, the signals on the gate terminals are assumed to be asserted high for purposes of discussion, but such should not be read as a limitation.

When an LLC converter is operating at resonance, the primary current waveform or primary current signal is sinusoidal as shown in plot 200, having current flow in both directions through the primary winding. In order to create the current flow, the high-gate terminal and the low-gate terminal are alternately asserted. In particular, assertion of the high-gate signal makes the high-side FET 108 (FIG. 1) conductive, which couples the input voltage $V_{DC}$ to the switch node 116 (FIG. 1). Assertion of the low-gate signal makes the low-side FET 110 (FIG. 1) conductive, which couples the switch node 116 to ground on the primary side 102 (FIG. 1).

FIG. 2 also shows example time periods of interest. In particular, a switching period is defined between any two consistent features of either the high-gate signal or the low-gate signal. For purposes of the discussion, the switching period $P_R$ in FIG. 2 is shown as the time between consecutive rising edges of the high-gate signal in plot 202. The frequency of switching is the inverse of the switching period. Within the example switching period $P_R$, first the high-gate signal is asserted, and then the low-gate signal is asserted. In particular, within the example switching period $P_R$ the high-gate signal has an asserted time or on-time 206, and the low-gate signal has an asserted time or on-time 208. In order to ensure that both the high-side FET 108 and the low-side FET 110 do not simultaneously conduct (thus shorting the input voltage $V_{DC}$ to ground on the primary side), there is first dead time 210 between the falling edge of the high-gate signal and the rising edge of the low-gate signal. Moreover, for the same reasons there is second dead time 212 between the falling edge of the low-gate signal and the rising edge of the high-gate signal (the rising edge at the beginning of the next switching period). Thus, within each example switching period $P_R$ there is an on-time 206 associated with the high-gate signal, a first dead time 210, an on-time 208 associated with the low-gate signal, and a second dead time 212. Considering that the dead times 210 and 212 are relatively short periods of time compared the on-times 206 and 208, the on-time 206 of the high-gate signal shall be considered to be a half period, and similarly, on-time 208 of the low-gate signal shall be considered a half period. Since the example waveforms of FIG. 2 are shown at resonance of the tank circuit of the LLC converter, the on-time 206 is a resonant half period, and similarly the on-time 208 is a resonant half period.

As the switching period increases, the on-time 206 and on-time 208 increase proportionally. Oppositely, as the switching period decreases, the on-time 206 and the on-time 208 decrease proportionally. Stated in terms of frequency of switching, as the frequency of switching decreases, the on-time 206 and the on-time 208 increase. And as the frequency of switching increases, the on-time 206 and the on-time 208 decrease. Stated in terms of on-time, an increase in on-time 206 of the high-gate signal results in an increase in on-time 208 of the low-gate signal, and vice versa. A decrease in the on-time 206 of the high-gate signal results in a decrease in on-time 208 of the low-gate signal, and vice versa.

Consider again plot 200 showing the primary current. When operating at resonance as shown, the primary current is sinusoidal. The slope of the primary current signal in plot 200 steadily varies over time. Stated differently, the first derivative of the primary current signal in plot 200 steadily varies over time. Example embodiments are directed to controlling frequency of switching based on the slope of primary current signal. In order to more fully describe controlling the frequency of switching based on the slope of the primary current signal, the specification now turns to example waveforms when the LLC converter is operating at other than resonance.

Figure 3:
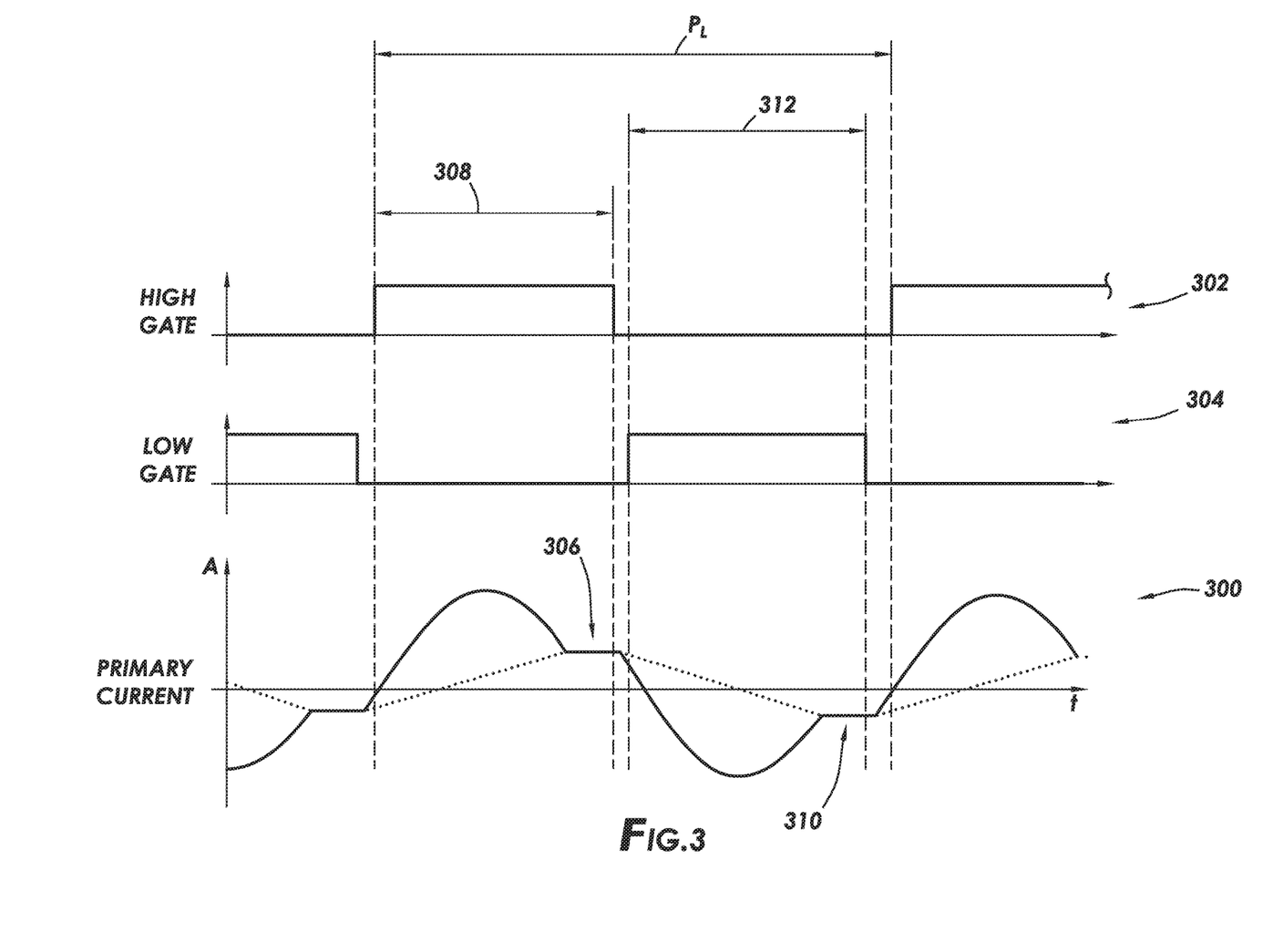
FIG. 3 shows an example set of waveforms of an LLC converter operating below resonance in accordance with at least some embodiments.

FIG. 3 shows an example set of waveforms of an LLC converter operating below resonance in accordance with at least some embodiments. In particular, FIG. 3 includes plot 300 that shows primary current (solid line) as well as magnetizing current (dashed line) as a function of time in the case of operating below resonance (i.e., at a frequency of switching lower than resonant frequency). FIG. 3 also includes plot 302 that shows the high-gate signal, and plot 304 that shows the low-gate signal. As before, the signals for the gate terminals are plotted on corresponding time with the primary current, and the signals on the gate terminals are assumed to be asserted high for purposes of discussion.

When an LLC converter is operated below resonance, the primary current signal is no longer sinusoidal. Rather, the primary current signal has various "flat" spots, such as region 306 during the on-time 308 of the high-gate signal, and region 310 during the on-time 312 of the low-gate signal. The "flat" spot as shown are actually a portion of a waveform with a frequency defined by a lower parallel resonant frequency, and thus in some cases appear "flat" as compared to the primary signal. If the switching period $P_L$ is longer than the resonant period, when the primary current is positive the primary current shape is changed as the continued application of the input voltage $V_{DC}$ to the switch node 116 (FIG. 1) resists falling current of the tank circuit, causing region 306. Similarly, when the primary current is negative the primary current tends to flatten as the continued coupling of ground on the primary side to the switch node 116 resists rising current of the tank circuit, causing region 310.

Consider again plot 300 showing the primary current. When operating below resonance as shown, the slope of the primary current signal in plot 300 does not steadily vary over time. For example, in the transition to the period of time associated with region 306, the slope has an abrupt change. As another example, in the transition to the period of time associated with region 310, the slope has an abrupt change. As will be discussed in greater detail below, example embodiments measure or sense the presence of regions 306 and/or 310 as an indication that the LLC converter is operating below resonance. Now the specification turns to the opposite case, operating above resonance.

Figure 4:
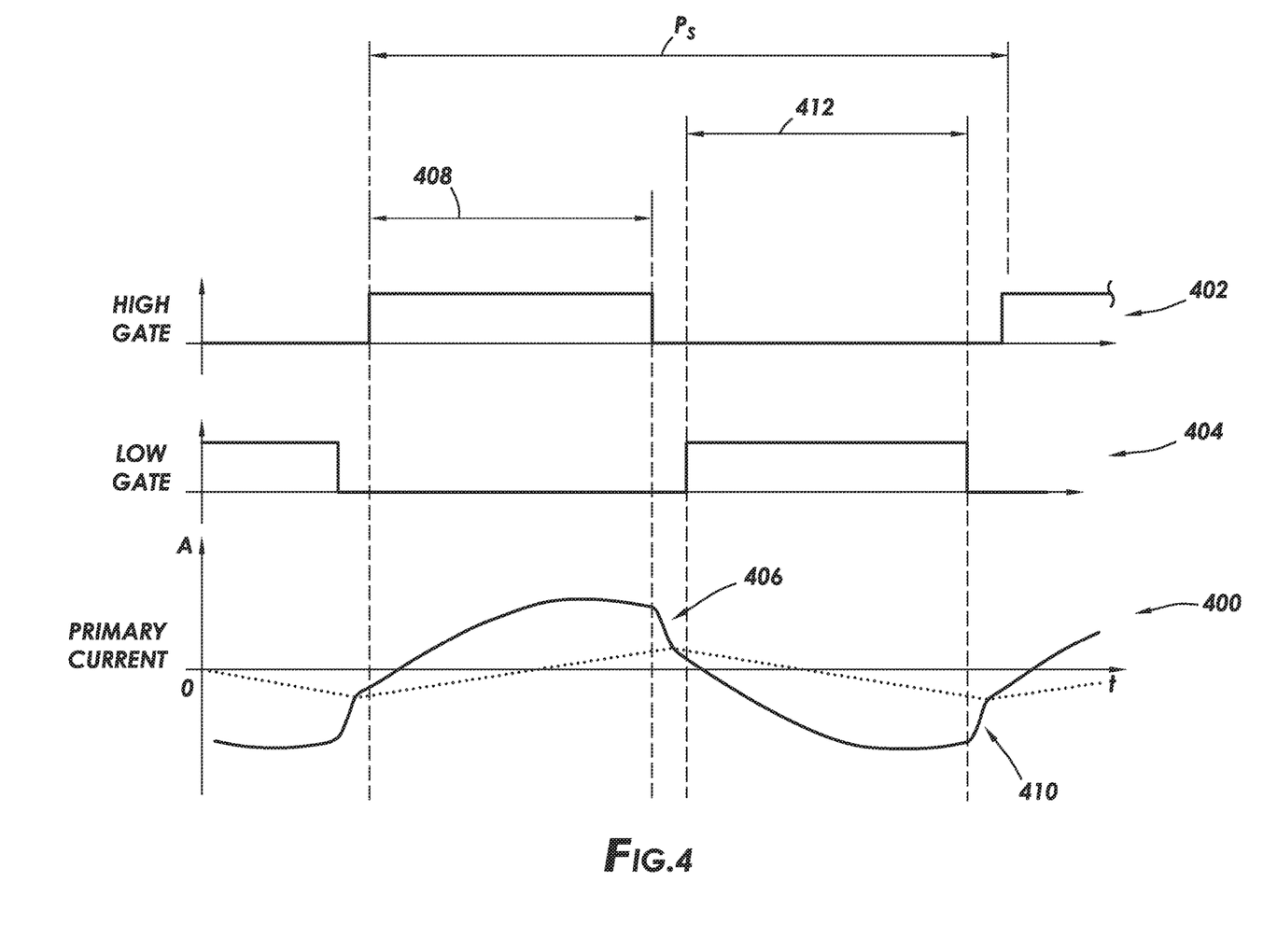
FIG. 4 shows an example set of waveforms of an LLC converter operating above resonance in accordance with at least some embodiments.

FIG. 4 shows an example set of waveforms showing an LLC converter operating above resonance in accordance with at least some embodiments. In particular, FIG. 4 includes plot 400 that shows primary current (solid line) as well as magnetizing current (dashed line) as a function of time in the case of operating above resonance (i.e., at a frequency of switching higher than resonant frequency). FIG. 4 also includes plot 402 that shows the high-gate signal, and plot 404 that shows the low-gate signal. As before, the signals for the gate terminals are plotted on corresponding time with the primary current, and the signals on the gate terminals are assumed to be asserted high for purposes of discussion.

When an LLC converter is operated above resonance, again the primary current signal is no longer sinusoidal. Rather, the primary current signal has various regions where the slope of the primary current signal abruptly changes, such as region 406 after the on-time 408 of the high-gate signal, and region 410 after the on-time 412 of the low-gate signal. That is, if the switching period Ps is shorter than the resonant period, when the primary current is positive the primary current tends to abruptly decrease as the input voltage $V_{DC}$ is disconnected from the switch node 116 (FIG. 1), causing region 406. Similarly, when the primary current is negative the primary current tends to abruptly increase as the low-gate signal 404 is disabled, causing region 410.

Consider again plot 400 showing the primary current. When operating above resonance as shown, the slope of the primary current signal in plot 300 does not steadily vary over time. For example, in the transition to the period of time associated with region 406, the slope has an abrupt change to a more negative slope. As another example, in the transition to the period of time associated with region 410, the slope has an abrupt change from a positive slope to a more positive slope.

Various example embodiments may use some or all these indications of the whether the LLC converter is operating below resonance (i.e., frequency of switching is low) or at resonance. More particularly still, example embodiments control frequency of switching based on the slope of primary current signal. Two example embodiments are presented, starting with an embodiment that controls the on-time in each switching period based on the slope such that the frequency of switching is just below resonance in each switching period.

Figure 5:
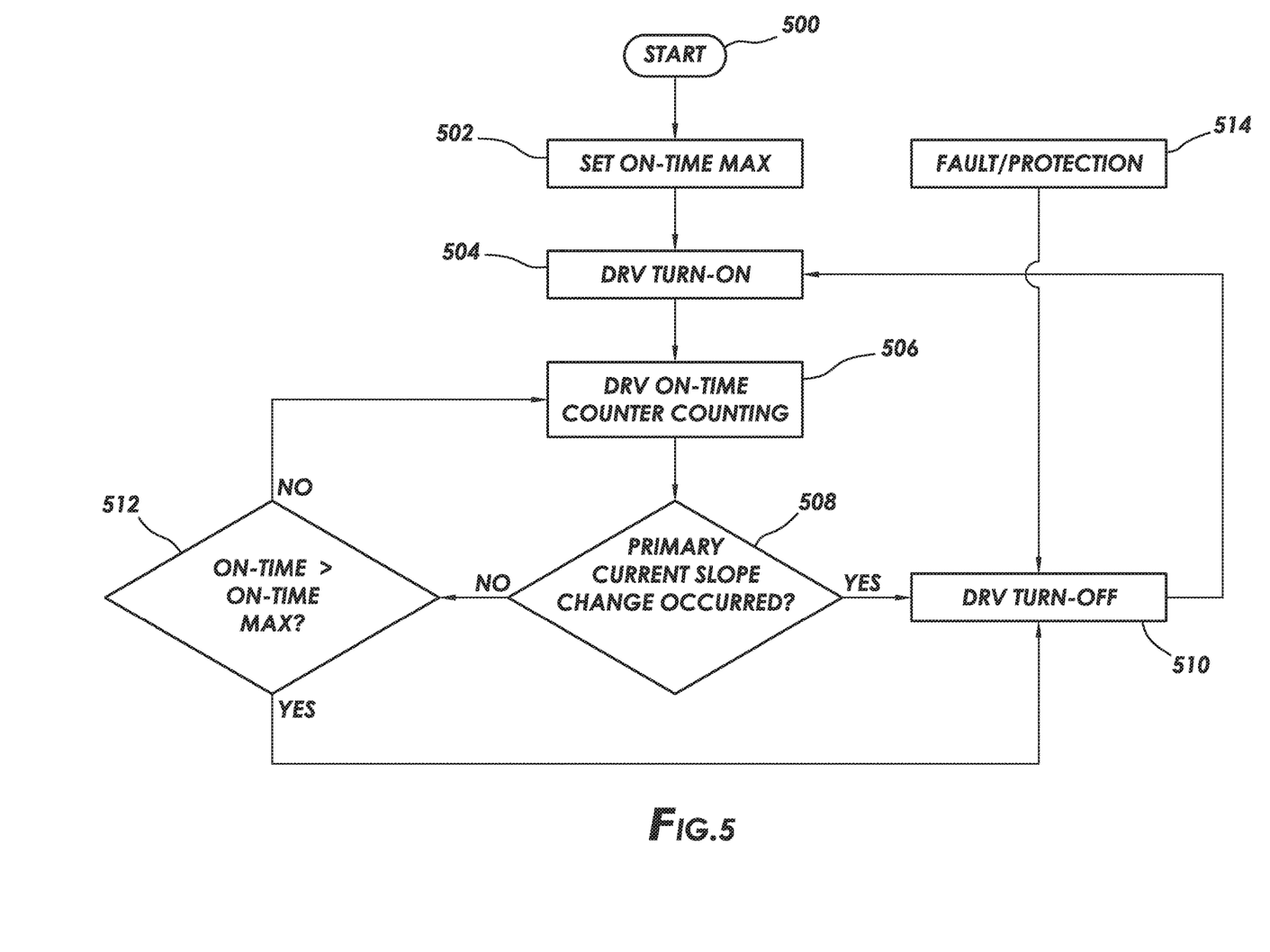
FIG. 5 shows a flow diagram of a method in accordance with at least some embodiments.

FIG. 5 shows a flow diagram of a method in accordance with at least some embodiments. In particular, FIG. 5 shows an example method where the LLC converter 100 (FIG. 1) is operated by the LLC controller 120 (FIG. 1) just below resonance (i.e., the frequency of switching is just below resonance). In particular, FIG. 5 shows a method where the on-time in each switching period is controlled based on the slope of the primary current signal.

Referring simultaneously to FIGS. 1 and 5. For purposes of explanation, first consider that the method of FIG. 5 is operated with the respect to the high-side FET 108 in each on-time (e.g., once each switching period). The example method starts (block 500), and proceeds to setting an on-time maximum value (block 502). The on-time maximum value represents the longest on time the example system will keep the high-side FET 108 conductive in any switching period. The example method then proceeds to driver turn-on ("DRV turn-on" in FIG. 5) (block 504). The driver turn-on in the example method asserts the high-gate terminal 122 and thus makes the high-side FET 108 conductive. Skipping for now the driver on-time counter counting (block 506), the example method proceeds to checking for a change in primary current slope (block 508). More particularly still, checking for a change in primary current slope (block 508) in example systems involves measuring values indicative of current through the primary winding 132 of the transformer 106, the measuring such as by the LLC controller 120 reading values of voltage at the node 170 by way of the current-sense terminal 162. Inasmuch as the high-side FET 108 is conductive during this portion of the example method, the measuring is during an on-time of the high-side FET 108. More particular still, controlling frequency may comprise calculating the slope of the primary current signal during the on-time of the high-side FET 108, and ending the on-time based on the slope of the primary current signal (again block 508). The change in slope that ends the primary current signal may be, for example, a slope change that indicates region 306 (FIG. 3), such as the slope has an abrupt change. It follows that in these example embodiments the on-time is ended when slope indicates the on-time exceeds a resonant half period of the tank circuit of the LLC converter 100. When a change in slope is detected that indicates that the on-time should end, the example method transitions to driver turn-off (block 510).

The example method of FIG. 5 also shows two safety features. The first safety feature involves the on-time maximum value set in block 502. That is, rather than loop within block 508 waiting for a change in slope that indicates the on-time should end, the example method loops through the determination of whether the on-time of the high-side FET 108 has exceeded the on-time maximum value (block 512). If not, the example again counts by way of the driver on-time counter counting (block 506), and again enters the determination regarding slope (block 508). If, however, the on-time of the high-side FET 108 has exceeded the on-time maximum value (again block 512, the "Yes" path), the example method transitions to driver turn-off (block 510). In example systems, the on-time maximum value is safety mechanism to ensure that, in the event of a failure somewhere in the system that senses current, the LLC converter will nevertheless remain operation, albeit at a frequency below the resonant frequency of the tank circuit. The second safety feature is shown by the "fault/protection" block (block 514). The fault/protection (block 514) turns off the circuit in the event of a fault, such as an over-voltage or over-current event.

The discussion with respect to FIG. 5 assumed that the driver turn-on (block 504) was with respect to the high-side FET 108, and thus the measurement of current was during the on-time of the high-side FET 108. However, the method works equally well if the turn-on event is with respect to the low-side FET 110, and in this case the method looks for a change in slope associated with region 310 of FIG. 3 associated with the low-side FET 110 (rather than region 306 associated with the high-side FET 108). In some cases, the example method of FIG. 5 is operated for both the high-side FET 108 and the low-side FET 110, and thus adjustments to frequency may be made twice in each switching period. The specification now turns to a second example embodiment.

Figure 6:
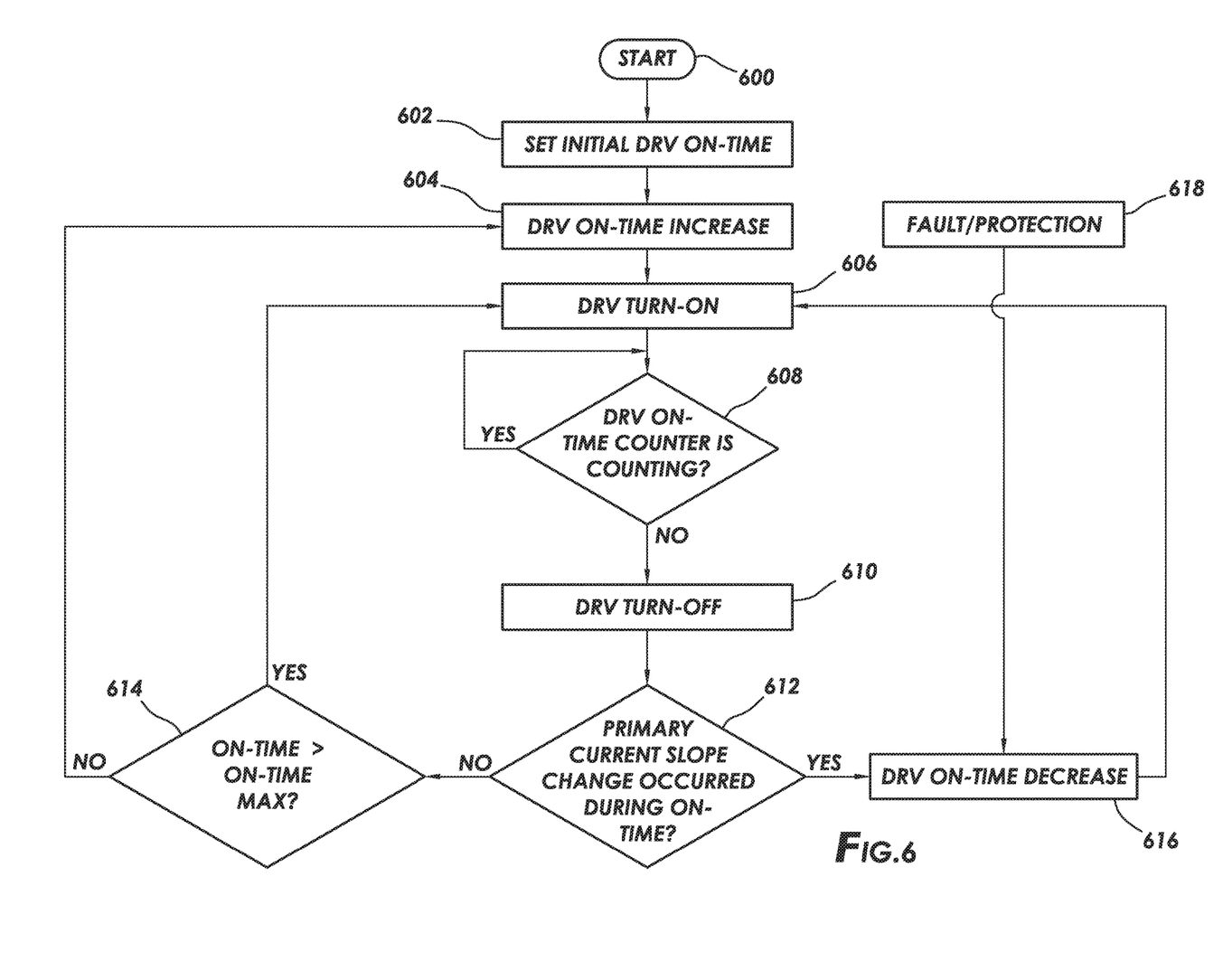
FIG. 6 shows a flow diagram of a method in accordance with at least some embodiments.

FIG. 6 shows a flow diagram of a method in accordance with at least some embodiments. In particular, FIG. 6 shows an example method where the LLC converter 100 (FIG. 1) is operated by the LLC controller 120 (FIG. 1) by toggling or alternating between operating at resonance of the tank circuit and just below resonance of the tank circuit. In particular, FIG. 6 shows a method where the on-time in each switching period is controlled based on the slope of the primary current signal in a prior switching period.

Referring simultaneously to FIGS. 1 and 6. For purposes of explanation, first consider that the method of FIG. 6 is operated with the respect to on-time of the high-side FET 108 in various switching periods. The example method starts (block 600) and proceeds to setting an initial driver on-time (block 602). In accordance with example embodiments, the initial driver on-time is set to be shorter than the expected resonant half period of the tank circuit. Stated otherwise, the initial frequency of switching is set above the expected resonant frequency of the tank circuit. Skipping for now the driver on-time increase (block 604), the example method proceeds to driver turn-on (block 606) in which the high-side FET 108 is made conductive. The example method then loops at the decision block in which the driver on-time counter is counting (block 608). When the on time reaches the driver on-time (again block 608, the first time through by reaching the initial driver on-time), the example method then proceeds to driver turn-off (block 610) in which the high-side FET 108 is made non-conductive (and after a dead time the low-side FET 110 is made conductive). While the example method is looping within the decision block 608, the LLC controller 120 measures values indicative of current through the primary winding 132 of the transformer 106. Stated otherwise, during an on-time of the high-side FET

108 the LLC controller 120 is measuring values indicative of current through the primary winding 132 and thus a current waveform or primary current signal is created.

The example method then proceeds to a determination of whether a primary current slope change occurred during the on-time (block 612). More particular still, the determination of block 612 may comprise calculating the slope of the primary current signal associated with the on-time, and determining whether a slope change occurred indicative of the on-time being longer than a resonant half period. Stated otherwise, the determination of block 612 may be whether the frequency of switching in the switching period is lower than a resonant frequency of the tank circuit of the LLC converter 100. Given that the initial driver on-time is set to be shorter than the expected resonant half period of the tank circuit (block 602), in the first few loops through the example method of FIG. 6 a slope change indicative of the on-time being longer than a resonant half period will not be found, and in those first few loops through the example method the determination (at block 612) takes the "No" path. Skipping for now the determination block 614, the example method retreats to the driver on-time increase (block 604). Stated otherwise, the first few loops through the example method of FIG. 6 the frequency of switching is decreased in each loop. In example embodiments, the decrease implemented by each iteration of the driver on-time (block 604) may be 100 nanoseconds (ns) or less, in some cases 50 ns, and in a particular case 10 ns (e.g., about a 0.1 Hertz change in frequency of switching).

At some point in the example method of FIG. 6 the driver on-time increase (block 604) will cause the on-time of the high-side FET 108 to match the resonant half period of the tank circuit, and then the driver on-time increase (block 604) will cause the on-time of the high-side FET 108 to be slightly longer than the resonant half period of the tank circuit. Stated in terms of frequency of switching, at some point in the example method of FIG. 6 the frequency of switching will be lowered to the resonant frequency of the tank circuit, and then the frequency of switching will be lowered just below the resonant frequency of the tank circuit. At that point in the example method of FIG. 6, a determination will be made (block 612) that a slope change occurred during the previous on-time indicative of the on-time being longer than the resonant half period of the tank circuit, and thus the exit of the determination (of block 612) takes the "Yes" path. In the case of controlling the high-side FET 108 according to FIG. 6, the change in slope may be a slope change that indicates region 306 (FIG. 3). Regardless of the precise slope detection to sense the presence of region 306, the example method then proceeds to the driver on-time decrease (block 616). In example embodiments, the increase implemented by each iteration of the driver on time (block 616) may be 100 nanoseconds (ns) or less, in some cases 50 ns, and in a particular case 10 ns (e.g., about a 0.1 Hertz change in frequency of switching). The example method then retreats to driver turn-on (block 606). It follows that the on-time of the high-side FET 108 in a subsequent (here immediately subsequent) switching period is based on the slope of the primary current signal (in the previous switching period). Assuming a stable resonant frequency of the tank circuit, the example method of FIG. 6 thus toggles or alternates between operating at resonance of the tank circuit and just below resonance of the tank circuit.

The example method of FIG. 6 also shows two safety features. The first safety feature involves a determination of whether the on-time in a switching period exceeded an on-time maximum value (block 614). In example systems, the on-time maximum value is a safety mechanism to ensure that, in the event of a failure somewhere in the system that senses current, the LLC converter will nevertheless remain operational. Thus, if the on-time of the high-side FET 108 exceeded the on-time maximum value (block 614), the example method transitions to driver turn-on (block 606) and continues operation, albeit at a frequency below resonant frequency of the tank circuit. The second safety feature is shown by the "fault/protection" block (block 618). The fault/protection (block 618) decreases the driver on-time (block 616), and thus increases frequency, independent of the determination (at block 612) regarding slope. If we consider that the best power transfer occurs when operating just below or at resonant frequency of the LLC converter, increasing the frequency thus decreases the amount of power conveyed to the output of the LLC converter in the event of overload or short circuit on the output.

The discussion with respect to FIG. 6 assumed that the driver turn-on (block 606) was with respect to the high-side FET 108, and thus the measurement of current was during the on-time of the high-side FET 108. However, the method works equally well if the turn-on event is with respect to the low-side FET 110, and thus the method looks for a change in slope associated with region 310 of FIG. 3 associated with the low-side FET 110 (rather than region 306 associated with the high-side FET 108). The specification now turns to an example LLC controller 120.

Figure 7:
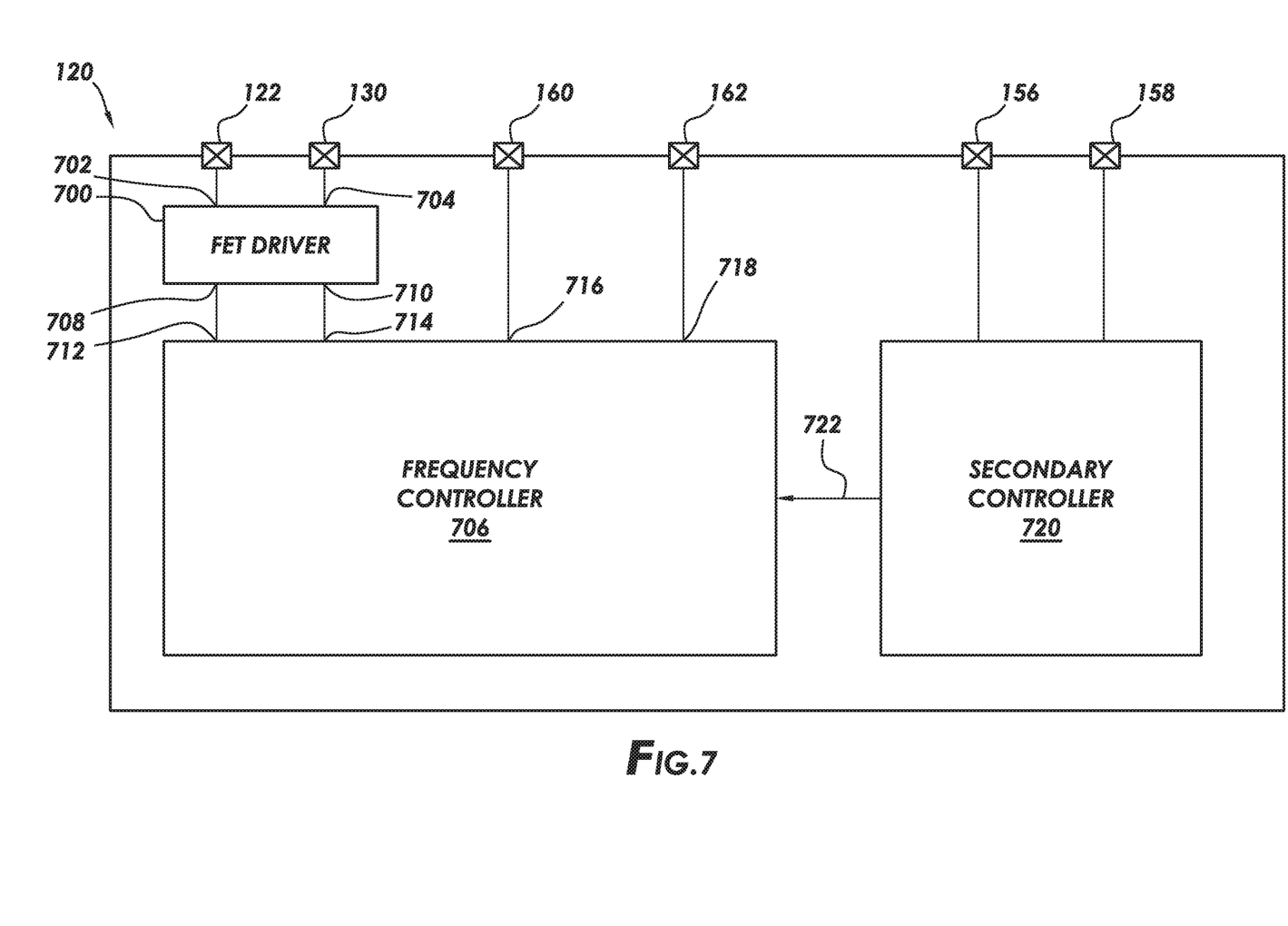
FIG. 7 shows a block diagram of a controller for an LLC converter in accordance with at least some embodiments.

FIG. 7 shows a block diagram of an LLC controller in accordance with at least some embodiments. In particular, FIG. 7 shows a block diagram of an LLC controller 120 for a resonant power converter, where the LLC controller 120 may be a monolithically constructed integrated circuit. The example LLC controller 120 comprises the high-gate terminal 122, the low-gate terminal 130, the switch-node terminal 160, the current-sense terminal 162, the rectifier terminal 156, and the feedback terminal 158, all at the same relative locations as shown in FIG. 1; however, the physical placement of terminals is arbitrary, and thus the location of the example terminals is not limiting. Moreover, additional terminals that would be present (e.g., power terminal, ground terminal) are omitted so as not to unduly complicate the figure.

The example LLC controller 120 comprises a FET driver 700. The FET driver 700 is designed and constructed to drive the gates of the high-side FET and low-side FET with appropriate signals. Thus, the FET driver 700 comprises a high-side output 702 coupled to the high-gate terminal 122, and a low-side output 704 coupled to the low-gate terminal 130. The FET driver 700 drives the respective gate terminals responsive to signals provided from the frequency controller 706. In the example system, the FET driver 700 thus comprises a high-side input 708 and a low side input 710, each coupled to the frequency controller 706. In most operational circumstances, the assertions of the gate signals to the gates of the FETS are mutually exclusive, and thus a single signal from the frequency controller 706 could suffice to provide the needed information from the frequency controller 706, but having two inputs provided also enables the frequency controller 706 to provide additional commands and information, such as a command to cease operational (e.g., when both the high-side input and low-side input are de-asserted).

The frequency controller 706 defines a high-side output 712 and a low-side output 714 coupled to the high-side input 708 and low-side input 710, respectively, of the FET driver 700. The frequency controller 706 further defines a sense input 716 coupled to the switch-node terminal 160. The example frequency controller 706 may sense the AC signal at the switch node 116 (FIG. 1) by way of the switch-node terminal 160 and sense input 716. The example frequency controller 706 further defines a current-sense input 718 coupled to the current-sense terminal 162. By way of the current-sense terminal 162 and the current-sense input 718, the example frequency controller 706 may sense primary current and implement controlling frequency of switching of the high-side FET and low-side FET in conformance with any of the various embodiments discussed above. That is, the frequency controller 706 may implement the example embodiments by way of any combination of digital and analog circuits within the frequency controller, including mixed circuits, and/or circuits where some or all the functionality is implemented by software or firmware executed by a processor or microcontroller.

The example LLC controller 120 further comprises secondary controller 720. The secondary controller 720 illustratively couples to the rectifier terminal 156 and the feedback terminal 158. In cases where the LLC controller 120 actively controls rectification on the secondary side, the secondary controller 720 may provide signals to drive the SR FET(s) by way of the rectifier terminal 156. Moreover, in example embodiments the secondary controller 720 senses output voltage by way of the feedback terminal 158, and provides a feedback signal to the frequency controller 706. In particular, in example cases the secondary controller 720 may be galvanically isolated from the frequency controller 706. The secondary controller 720 may send feedback signals (illustrated by line 722) by any suitable isolated method, such as by capacitive coupling.

Figure 8:
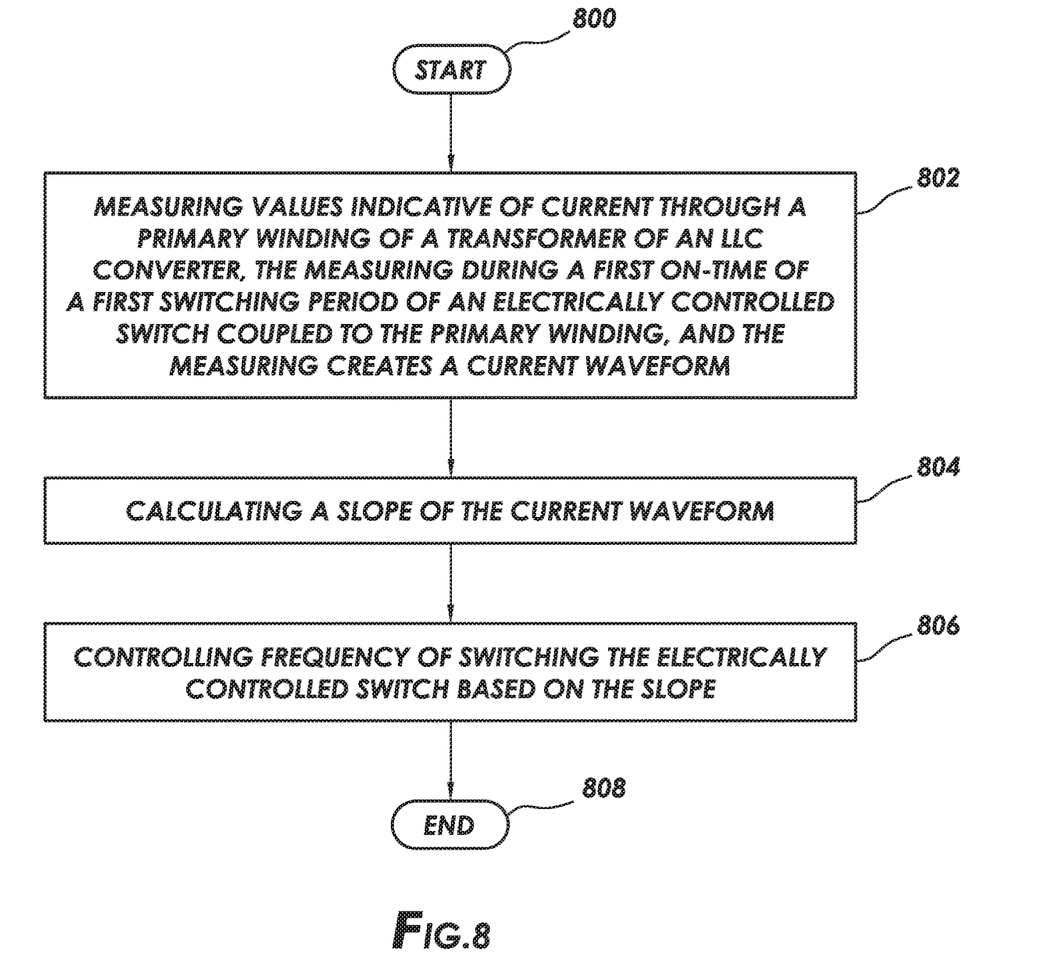
FIG. 8 shows a method in accordance with at least some embodiments.

FIG. 8 shows a method in accordance with at least some embodiments. In particular, the method starts (block 800) and comprises: measuring values indicative of current through a primary winding of a transformer of an LLC converter, the measuring during a first on-time of a first switching period of an electrically controlled switch coupled to the primary winding, and the measuring creates a current waveform (block 802); calculating a slope of the current waveform (block 804); and controlling frequency of switching the electrically controlled switch based on the slope (block 806). Thereafter the method ends (block 808), likely to be immediately restarted for the next on-time or in the next switching period.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating an inductor-inductor-capacitor (LLC) converter, the method comprising:
    measuring values indicative of current through a primary winding of a transformer of an LLC converter, the measuring during a first on-time of a first switching period of an electrically controlled switch coupled to the primary winding, and the measuring creates a current waveform;
    calculating a slope of the current waveform; and
    controlling frequency of switching the electrically controlled switch based on the slope.

2. The method of claim 1 wherein controlling frequency further comprises setting a subsequent on-time of the electrically controlled switch in a subsequent switching period based on the slope of the current waveform.

3. The method of claim 2 wherein setting the subsequent on-time of the electrically controlled switch in the subsequent switching period further comprises increasing the subsequent on-time relative to the first on-time if the slope of the current waveform indicates the first on-time was a resonant half period or shorter than the resonant half period.

4. The method of claim 2 wherein setting the subsequent on-time of the electrically controlled switch in the subsequent switching period further comprises decreasing the subsequent on-time relative the first on-time if the slope of the current waveform indicates the first on-time was a longer than a resonant half period.

5. The method of claim 2 wherein controlling frequency further comprises controlling the subsequent on-time of the electrically controlled switch in an immediately subsequent switching period based on the slope of the current waveform.

6. The method of claim 1 wherein controlling frequency further comprises:
    calculating the slope of the current waveform during the first on-time of the electrically controlled switch; and
    ending the first on-time based on the slope of the current waveform.

7. The method of claim 6 wherein ending the first on-time further comprises ending the first on-time when the slope indicates the first on-time exceeds a resonant half period.

8. A controller for an inductor-inductor-capacitor (LLC) converter, the controller comprising:
    a high-gate terminal, a low-gate terminal, and a current-sense terminal;
    a frequency controller coupled to the high-gate terminal, the low-gate terminal, and the current-sense terminal, the frequency controller configured to:
        assert the high-gate terminal for a first asserted time during a first switching period;
        measure values indicative of current by way of the current-sense terminal, the measuring during the first asserted time, and the measurement creates a current waveform;
        calculate a slope of the current waveform; and
        control frequency of assertion of the high-gate terminal based on the slope.

9. The controller of claim 8 wherein when the frequency controller controls frequency of assertion of the high-gate terminal, the frequency controller is further configured to set an asserted time of the high-gate terminal in a subsequent switching period based on the slope of the current waveform in the first switching period.

10. The controller of claim 9 wherein when the frequency controller sets the asserted time of the high-gate terminal in the subsequent switching period, the frequency controller is further configured to increase the asserted time of the high-gate terminal in the subsequent switching period if the slope of the current waveform in the first switching period indicates the first asserted time was a resonant half period or shorter than the resonant half period.

11. The controller of claim 9 wherein when the frequency controller sets the asserted time of the high-gate terminal in the subsequent switching period, the frequency controller is further configured to decrease the asserted time of the high-gate terminal in the subsequent switching period if the slope of the current waveform in the first switching period indicates the first asserted time was longer than a resonant half period.

12. The controller of claim 9 wherein when the frequency controller controls frequency, the frequency controller is further configured to set the asserted time of the high-gate terminal in an immediately subsequent switching period based on the slope of the current waveform.

13. The controller of claim 8 wherein when the frequency controller controls frequency, the frequency controller is further configured to:
 calculate the slope of the current waveform during the first asserted time; and
 end the first asserted time based on the slope of the current waveform.

14. The controller of claim 13 wherein when the frequency controller ends the first asserted time, the frequency controller is further configured to end the first asserted time when the slope indicates the first asserted time exceeds a resonant half period.

15. An inductor-inductor-capacitor (LLC) converter, comprising:
 a primary side comprising:
  a high-side electrically-controlled switch configured to couple an input voltage to a switch node based on a control input;
  a low-side electrically-controlled switch configured to couple the switch node to ground based on a control input;
  a primary winding of a transformer having a first lead coupled to the switch node;
  a capacitor coupled between a second lead of the transformer and ground;
  an LLC controller coupled to the control input of the high-side electrically-controlled switch, the control input of the low-side electrically-controlled switch, and the second lead of the primary winding;
 a secondary side comprising:
  a secondary winding of the transformer;
  a secondary rectifier coupled between the transformer and an output voltage of the LLC converter;
 the LLC controller is configured to:
  measure values indicative of current through the primary winding, the measurement during a first on-time of the high-side electrically-controlled switch in a first switching period, and the measurement creates a current waveform;
  calculate a slope of the current waveform; and
  control frequency of switching the high-side electrically-controlled switch based on the slope.

16. The LLC converter of claim 15 wherein when the LLC controller controls frequency, the LLC controller is further configured to set a subsequent on-time of the high-side electrically-controlled switch in a subsequent switching period based on the slope of the current waveform.

17. The LLC converter of claim 16 wherein when the LLC controller sets the subsequent on-time of the high-side electrically-controlled switch in the subsequent switching period, the LLC controller is further configured to increase the subsequent on-time relative to the first on-time if the slope of the current waveform indicates the first on-time was a resonant half period or shorter than a resonant half period.

18. The LLC converter of claim 16 wherein when the LLC controller sets the subsequent on-time of the high-side electrically-controlled switch in the subsequent switching period, the LLC controller is further configured to decrease the subsequent on-time relative to the first on-time if the slope of the current waveform indicates the first on-time was a longer than a resonant half period.

19. The LLC converter of claim 16 wherein when the LLC controller controls frequency, the LLC controller is further configured to control the subsequent on-time of the high-side electrically-controlled switch in an immediately subsequent switching period based on the slope of the current waveform.

20. The LLC converter of claim 15 wherein when the LLC controller controls frequency, the LLC controller is further configured to:
 calculate the slope of the current waveform during the first on-time of the high-side electrically-controlled switch; and
 end the first on-time when the slope indicates the first on-time exceeds the resonant half period.

* * * * *